Aug. 4, 1959  H. R. TISSERANT  2,897,696
SHEET METAL PANEL DRILL
Filed Jan. 13, 1956
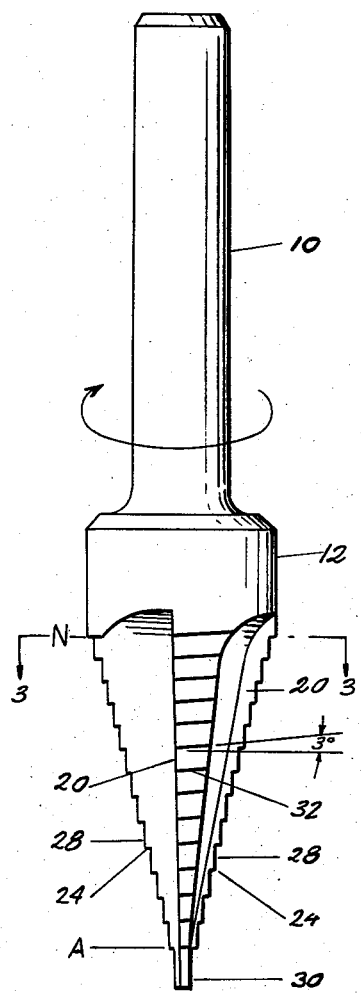
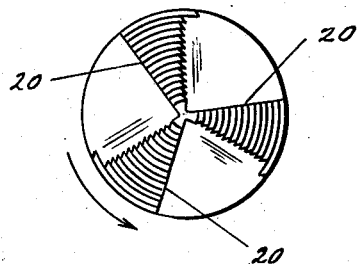
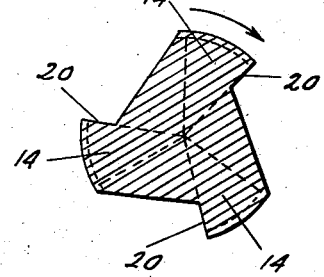
INVENTOR.
HENRY R. TISSERANT
BY Ostrolenk, Faber,
Gerb & Soffen
ATTORNEYS

United States Patent Office 2,897,696
Patented Aug. 4, 1959

2,897,696

SHEET METAL PANEL DRILL

Henry R. Tisserant, Jackson Heights, N.Y.

Application January 13, 1956, Serial No. 558,975

1 Claim. (Cl. 77—67)

This invention relates to drilling devices and more particularly to a device for drilling sheet metal panels, for example, as used in electronic work.

It is an object of the invention to provide a drill which may be used selectively for cutting clean holes in sheet-stock material.

It is another object of the invention to provide a device which may cut a hole of any desired diameter within the designed range of the tool.

It is a further object of the invention to provide a drilling device which will be simple and cheap to manufacture and of great versatility in service.

It is a still further object of the invention to provide a panel cutting tool having simple cutting edges which may be readily sharpened.

It is an even further object of the invention to provide a panel drilling structure which may be readily manufactured with slight change for specialized purposes in drilling panels of various materials such as aluminum, brass, steel, etc.

It has heretofore been customary in drilling sheet metal panels, particularly for radio and TV chassis work, to employ individual drills of various cutting diameters depending upon the size of aperture desired.

Accordingly, for a large variety of apertures, particularly as required in experimental work, it is necessary to have a correspondingly large and expensive assortment of hole-drilling tools. My present invention overcomes these disadvantages by providing, in a single tool, a plurality of stepped cutting edges which are so graded as to cut apertures of progressively increasing size wherein each aperture varies in diameter from the preceding aperture to an extent commensurate with the diameter of a complete ring of a material removed from the annular margin of the preceding aperture. In other words, by providing a tool so designed as to have a series of cutting edges which progressively increase in diameter, a series of individual rings may be cut from a panel, thereby effecting a series of apertures of ever increasing diameter until a desired diameter of aperture is reached. At this point, the tool may be removed.

In the construction of my tool I prefer to utilize a substantially conical shaped drill body comprising three radially extending webs, the faces and edges of which are provided with cutting surfaces of simple and durable nature. Such cutting surfaces may be readily obtained in manufacture and sharpened with relative ease since no compound curves or other complex formations are encountered.

My invention will now be described in conjunction with the appended drawing in which:

Figure 1 is an elevation of a drill made in accordance with the teachings herein.

Figure 2 is an end view looking upwardly from the point of the drill.

Figure 3 is a section taken along 3—3 of Figure 1.

Referring now to the drawing, the construction contemplated comprises a shank 10 suitable for chucking in a portable drill or in a drill press. The shank terminates in a tapered drill body 10 adapted to be rotated in conventional clockwise direction as viewed in Figure 2. The body 12 is conically formed with three webs 14 laid out so as to comprise vertical walls, such as 20, spaced 120° apart. Such vertical walls form the cutting elements of the tool by way of forward horizontal edges 24 and vertical edges 28 which come to a substantial right angle as shown in Figure 1. Thus, a series of stepped cutting diameters are provided wherein each has three cutting edges 24 in the same horizontal plane, for cutting a series of apertures of progressively increasing size. With the drill shown in the drawing, starting at the level A and progressing upwardly to the level N, some fourteen different size apertures may be cut. For example, the edges 24 and their coacting edges 28 would cut an aperture of one-quarter inch diameter at the level A, whereas at the level N an aperture of one and one-half inches would be cut.

Preferably, the lower tip of the drill is provided with a pilot drill such as 30, or such lower tip could be a smooth turning for insertion into a previously drilled hole.

Inasmuch as at each of the levels A through N the horizontal forward cutting edges 24 are on the same plane, it will be apparent that the drill will cut out a series of individual concentric rings of ever increasing diameter.

It should be noted that the edges 24 as viewed in Figure 1 are disposed in a plane which is perpendicular to the axis of the drill. Thus, ease of manufacture is obtained by providing simple perpendicular angularity of the cutting edges with respect to the drill axis. However, the surfaces 32 which are back of the front cutting edges 24 may be disposed at an angle of 3° or so to effect proper cutting clearance. Such angularity is variable depending upon the material being cut, the angularity being with respect to respective planes which contain the three edges 24 at any diameter.

In order to provide proper clearance for the vertical edges 28 of the teeth, a slight taper of the order of about .001" is utilized from the respective cutting edges 24 to the next larger step.

In practice, if it be assumed that the tool depicted herein will cut a series of apertures from ¼" diameter to 1½" in diameter, larger apertures may be cut by providing an additional tool wherein the smallest aperture would be of a size, say 1½" in diameter expanding therefrom to any desired size.

Thus, if each such tool has, say, 14 levels of cutting edges, then two such tools would provide for 28 different aperture sizes. This is a marked improvement over prior art expedients wherein an assortment of some 28 tools would be required. In any event, a single embodiment shown herein would fully supplant a set of fourteen cutting tools as used in the prior art and constitutes a marked improvement thereover insofar as economy of first cost and complexity of storage is concerned.

Having thus described my invention, I am aware that various changes may be made without departing from the spirit thereof and accordingly I do not seek to be limited to the precise illustration herein given except as set forth in the appended claim.

I claim:

A multi-diameter sheet metal cutting tool having a rotary body shaped in steps of progressively increasing diameter wherein each step has a plurality of peripheral coplanar cutting edges angularly spaced; said body having angularly spaced cylindrical sectors between steps corresponding to said peripheral cutting edges; said sectors being cylindrical for substantially the full distance between steps so as to maintain said tool in true center when cutting holes of progressively increasing diameter; a surface extending from each peripheral cutting edge being inclined to the respective plane of each group of peripheral cutting edges to effect a cutting clearance.

References Cited in the file of this patent

UNITED STATES PATENTS

| | | |
|---|---|---|
| 390,080 | Hipkins | Sept. 25, 1888 |
| 2,276,532 | Welty | Mar. 17, 1942 |
| 2,786,373 | Patton | Mar. 26, 1957 |

FOREIGN PATENTS

| | | |
|---|---|---|
| 1,080,865 | France | June 2, 1954 |